United States Patent
Kim

(10) Patent No.: US 11,494,573 B2
(45) Date of Patent: Nov. 8, 2022

(54) SELF-CHECKOUT DEVICE TO WHICH HYBRID PRODUCT RECOGNITION TECHNOLOGY IS APPLIED

(71) Applicant: EXASCOPE INC. CO., LTD., Seoul (KR)

(72) Inventor: Chang Yul Kim, Seoul (KR)

(73) Assignee: NEUROGIC INC., Seoul (KR)

( * ) Notice: Subject to any disclaimer, the term of this patent is extended or adjusted under 35 U.S.C. 154(b) by 44 days.

(21) Appl. No.: 16/963,403

(22) PCT Filed: Jan. 22, 2019

(86) PCT No.: PCT/KR2019/000864
§ 371 (c)(1),
(2) Date: Jul. 20, 2020

(87) PCT Pub. No.: WO2019/143217
PCT Pub. Date: Jul. 25, 2019

(65) Prior Publication Data
US 2021/0397800 A1    Dec. 23, 2021

(30) Foreign Application Priority Data
Jan. 22, 2018    (KR) .................. 10-2018-0007612

(51) Int. Cl.
*G06K 7/10* (2006.01)
*G06V 10/44* (2022.01)
(Continued)

(52) U.S. Cl.
CPC ......... *G06K 7/1096* (2013.01); *G06K 7/1443* (2013.01); *G06K 7/1456* (2013.01); *G06Q 20/208* (2013.01); *G06V 10/443* (2022.01)

(58) Field of Classification Search
CPC .. G06K 7/1443; G06K 7/1456; G06K 7/1096; G06K 9/4306; G06K 7/1404;
(Continued)

(56) References Cited

U.S. PATENT DOCUMENTS

2010/0158310 A1* 6/2010 McQueen ................ G06K 9/00
382/100
2013/0020392 A1* 1/2013 Olmstead ............. G07G 1/0063
235/440
(Continued)

FOREIGN PATENT DOCUMENTS

JP    H06243340 A    9/1994
JP    2009289222 A    12/2009
(Continued)

OTHER PUBLICATIONS

International Search Report issued in International Application No. PCT/KR2019/000864 dated May 14, 2019 (7 pages).
(Continued)

*Primary Examiner* — Edwyn Labaze
(74) *Attorney, Agent, or Firm* — Osha Bergman Watanabe & Burton LLP

(57) ABSTRACT

Disclosed in the present specification is a self-checkout device to which hybrid product recognition technology is applied and which helps a user to more conveniently and quickly make a payment. The self-checkout device according to the present specification photographs a product with a plurality of cameras, and then recognizes a barcode by detecting a barcode region from the captured images and, simultaneously, extracts a feature point of the images such that a product can be recognized through the calculation of the proportion that matches with a reference image of the product. Thus, a product can be quickly recognized through barcode recognition and packaging paper recognition in a product image.

14 Claims, 9 Drawing Sheets

(51) Int. Cl.
*G06K 7/14* (2006.01)
*G06Q 20/20* (2012.01)

(58) Field of Classification Search
CPC ............ G06K 7/14; G06K 7/00; G06K 9/209;
G06K 9/00; G06Q 20/208
USPC ................ 235/440, 439, 454, 435, 375, 470
See application file for complete search history.

(56) References Cited

U.S. PATENT DOCUMENTS

| | | |
|---|---|---|
| 2014/0052555 A1 | 2/2014 | MacIntosh |
| 2014/0286577 A1* | 9/2014 | Suk ........................... G06T 7/33 |
| | | 382/192 |
| 2016/0132855 A1 | 5/2016 | Yamamoto |
| 2017/0293820 A1* | 10/2017 | Sawada ................ G06K 9/6215 |

FOREIGN PATENT DOCUMENTS

| | | |
|---|---|---|
| JP | 2014021915 A | 2/2014 |
| KR | 20070017244 A | 2/2007 |
| KR | 20110137004 A | 12/2011 |
| KR | 20130139853 A | 12/2013 |
| KR | 101807205 B1 | 12/2017 |

OTHER PUBLICATIONS

Written Opinion issued in International Application No. PCT/KR2019/000864 dated May 14, 2019 (5 pages).
Extended European Search Report issued in corresponding EP Application No. 19740787.7 dated Sep. 9, 2021 (8 pages).

\* cited by examiner

PRIOR ART

SELF-CHECKOUT DEVICE TO WHICH HYBRID PRODUCT RECOGNITION TECHNOLOGY IS APPLIED

This application claims priority from Korean Patent Application No. 10-2018-0007612, filed on Jan. 22, 2018 in the Korean Intellectual Property Office, the disclosure of which is incorporated herein by reference in its entirety.

TECHNICAL FIELD

The present invention relates to a self-checkout device, and more particularly, to a self-checkout device to which hybrid product recognition technology, which assists a user in more conveniently and rapidly making a payment, is applied.

BACKGROUND ART

In the case of large stores or medium-to-large size supermarkets, a self-checkout counter, which does not require a cashier, is installed and operated in order to reduce a waiting time for customers to wait in line in front of the checkout counter or for customers who do not want to show their purchased products to a cashier.

FIG. 1 is an exemplary diagram of a self-checkout counter according to the related art.

Referring to FIG. 1, most self-checkout counters are equipped with one or two barcode scanners, and when a customer searches for barcodes of products one by one and places the barcode on a front surface of the scanner, the product is processed in such a manner that the product is recognized.

In such a self-checkout counter, there is an inconvenience that products should be taken out of a shopping basket one by one to find barcodes of the products and the barcodes should be moved an appropriate distance from a front surface of a scanner. This is an inconvenience caused by the barcodes of the products differing in size and attachment position thereof. In the case of some products, a portion of the barcode may be exposed such as to be difficult to recognize and a portion of the barcode may be damaged. In this case, depending on the situation, with the help of a cashier, the barcode of the product is recognized using a laser-type hand scanner, or a unique serial number of the product is input to recognize the product.

Such a recognition method and an exceptional situation are factors that lower the convenience to a customer using a self-checkout counter and the functional reliability of the checkout counter.

DISCLOSURE

Technical Problem

The present invention is directed to providing a self-checkout device to which hybrid product recognition technology, which assists a user in more conveniently and rapidly making a payment, is applied.

Objects of the present specification are not limited to the aforementioned objects and other objects not mentioned herein will be clearly understood from the following description by those skilled in the art.

Technical Solution

According to an embodiment of the present invention, a self-checkout device includes a storage unit configured to store feature point information about reference images for a plurality of product wrappers, a product recognition scanner module configured to output a plurality of images of a product placed on a product rack through a plurality of cameras, an image feature point extraction module configured to extract feature points of each image of the plurality of images output from the product recognition scanner module, an image feature point matching module configured to calculate matching ratios between the feature points of the images extracted by the image feature point extraction module and feature points of the reference images stored in the storage unit, and a product recognition module configured to recognize the product positioned at the product recognition scanner module as a specific product using matching ratio information calculated by the image feature point matching module.

The product rack may be a conveyer belt.

The product recognition scanner module may includes a support frame having a form which surrounds a top side, a left side, and a right side of the product placed on the product rack, and the plurality of cameras positioned on inner sides of the support frame and installed to photograph the product placed on the product rack.

The self-checkout device may further include a motion sensor configured to sense whether the product placed on the product rack approaches. In this case, when the product is sensed by the motion sensor, the product recognition scanner module may output the plurality of images through the plurality of cameras.

The product recognition module may perform recognition the product positioned at the product recognition scanner module as a specific product corresponding to a reference image having a highest matching ratio among the matching ratio information calculated by the image feature point matching module.

The image feature point matching module may output matching ratio information about a product, which has a preset reference ratio or higher among the calculated matching ratios, to the product recognition module.

The image feature point matching module may determine that a plurality of products are present when different products are present within a preset error ratio based on a highest ratio value of the calculated matching ratios.

The image feature point matching module may output information about each of the plurality of products by inversely matching the feature points of the reference images stored in the storage unit with the feature points of the images used by the image feature point extraction module (the plurality of images output from the product recognition scanner module and used to extract a feature point of an image).

The self-checkout device may further include an image feature point management module configured to store a matching frequency for each feature point, which matches the feature point of the image extracted by the image feature point extraction module, of the feature points of the reference images stored in the storage unit and configured to classify the feature points of the reference images stored in the storage unit into groups according to at least one matching frequency criterion set in advance. In this case, after a preset storage period has elapsed, the image feature point management module may delete the feature points, which are included in a group having a relatively lowest matching frequency among the feature points classified into the groups, from the storage unit.

The image feature point matching module may first calculate the matching ratios between the feature points, which are included in a group having a highest matching frequency among the classified feature points, and the feature points of the image extracted by the image feature point extraction module.

The self-checkout device may further include a barcode region detection module configured to select the image in which a product barcode is photographed among the plurality of images output from the product recognition scanner module and extract a product barcode region from the selected image, and a barcode recognition module configured to recognize a product barcode image extracted by the barcode region detection module as the barcode information. In this case, the storage unit may further store barcode information about a product, and the product recognition module may recognize the product positioned at the product recognition scanner module as a specific product having information which matches the barcode information, which is recognized by the barcode recognition module, among barcodes stored in the storage unit.

The product recognition module may recognize the product positioned at the product recognition scanner module using first output information of i) the barcode information recognized by the barcode recognition module and ii) the matching ratio information calculated by the image feature point matching module.

When i) the product recognized through the barcode information recognized by the barcode recognition module matches ii) a product recognized through matching ratio information calculated by the image feature point matching module, the product recognition module may recognize the matched product as the product positioned at the product recognition scanner module.

When i) the product recognized through the barcode information recognized by the barcode recognition module is different from ii) a product recognized through matching ratio information calculated by the image feature point matching module, the product recognition module may recognize the product recognized through the barcode information recognized by the barcode recognition module as the product positioned at the product recognition scanner module.

Other specific details of the present invention are included in the detailed description and drawings.

Advantageous Effects

According to one aspect of the present specification, since a user (customer) does not need to find a barcode of a product and make a scanner recognize the barcode, user convenience can be increased as compared with a conventional self-checkout counter. In addition, a product calculation speed can be increased, thereby increasing usage satisfaction of the user (customer).

According to another aspect of the present specification, even different products within the same product group (for example, products having different amounts among products having the same brand name of the same manufacturer) can be distinguished from each other and be recognized through image feature point-based technology, thereby increasing reliability and satisfaction of a user.

Effects of the present invention are not limited to the above-described effects, and other effects not described above may be clearly understood to those skilled in the art from the description below.

MODES OF THE INVENTION

Figure 1:
FIG. 1 is an exemplary diagram of a self-checkout counter according to a related art.

Advantages and features of the invention disclosed in the present specification and methods for accomplishing the same will be more clearly understood from embodiments described below with reference to the accompanying drawings. However, the present specification is not limited to the following embodiments but may be implemented in various different forms. The embodiments are provided only to complete the disclosure of the present specification and to fully provide a person having ordinary skill in the art to which the present invention pertains (hereinafter, referred to as those skilled in the art) with the category of the present specification. The scope of the technical spirit of the present specification is only defined by the scope of accompanying claims.

The terms used in the present specification are for describing the embodiments and are not intended to limit the scope of the technical spirit of the present specification. As used herein, singular expressions, unless defined otherwise in contexts, include plural expressions. The meaning of "comprises" and/or "comprising" used in this specification does not exclude the existence or addition of one or more other components in addition to the mentioned components. The same reference numerals denote the same components throughout the specification. As used herein, the term "and/or" includes any and all combinations of one or more of the associated components. It will be understood that, although the terms "first," "second," and the like may be used herein to describe various components, these components should not be limited by these terms. These terms are only used to distinguish one component from another component. Therefore, a first component described below could be termed a second component without departing from the scope and spirit of the present invention.

Unless otherwise defined, all terms (including technical and scientific terms) used in the present specification may be used as the same meaning which may be commonly understood by the person with ordinary skill in the art to which the present invention belongs. In addition, it will be further understood that terms defined in commonly used dictionaries should not be interpreted in an idealized or excessive sense unless expressly and specifically defined.

Spatially relative terms, such as "below," "beneath," "lower," "above," "upper," and the like, may be used to easily describe relationships between one component and another component as shown in the drawings. It will be understood that the spatially relative terms are intended to encompass different orientations of components in use or in operation in addition to the orientation depicted in the drawings. For example, when a component shown in the drawing is turned over, a component described as "below," "beneath," or "under" another component would then be oriented "above" another component. Thus, the exemplary term "below" can encompass both an orientation of above and below. Since a component may be oriented in another direction, the spatially relative terms may be interpreted in accordance with the orientation of the component.

Hereinafter, embodiments of the present invention will be described in detail with reference to the accompanying drawings.

Figure 2:
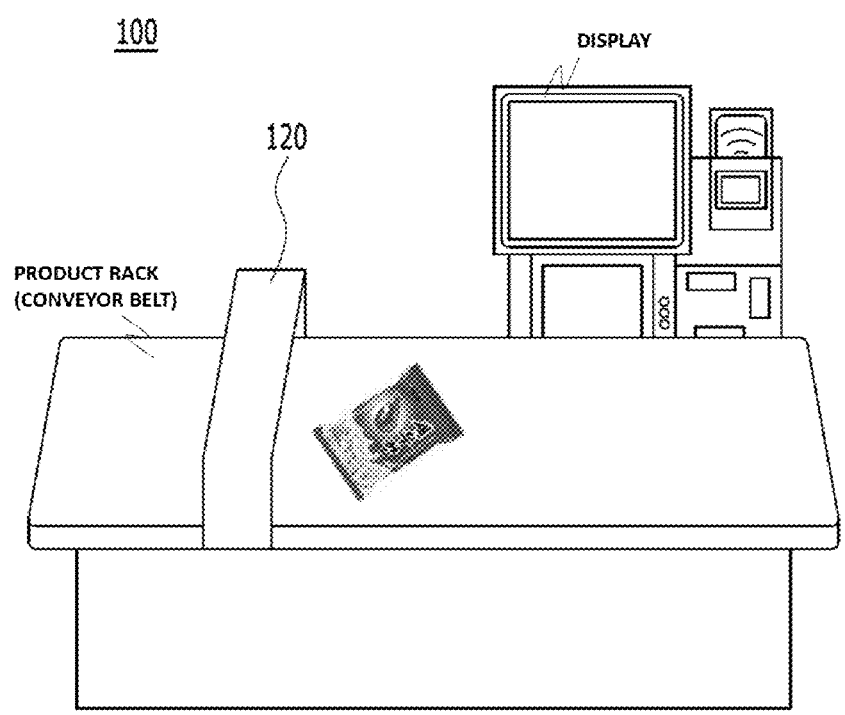
FIG. 2 is an exemplary diagram of an exterior of a self-checkout device according to the present specification.

FIG. 2 is an exemplary diagram of an exterior of a self-checkout device according to the present specification.

Figure 3:
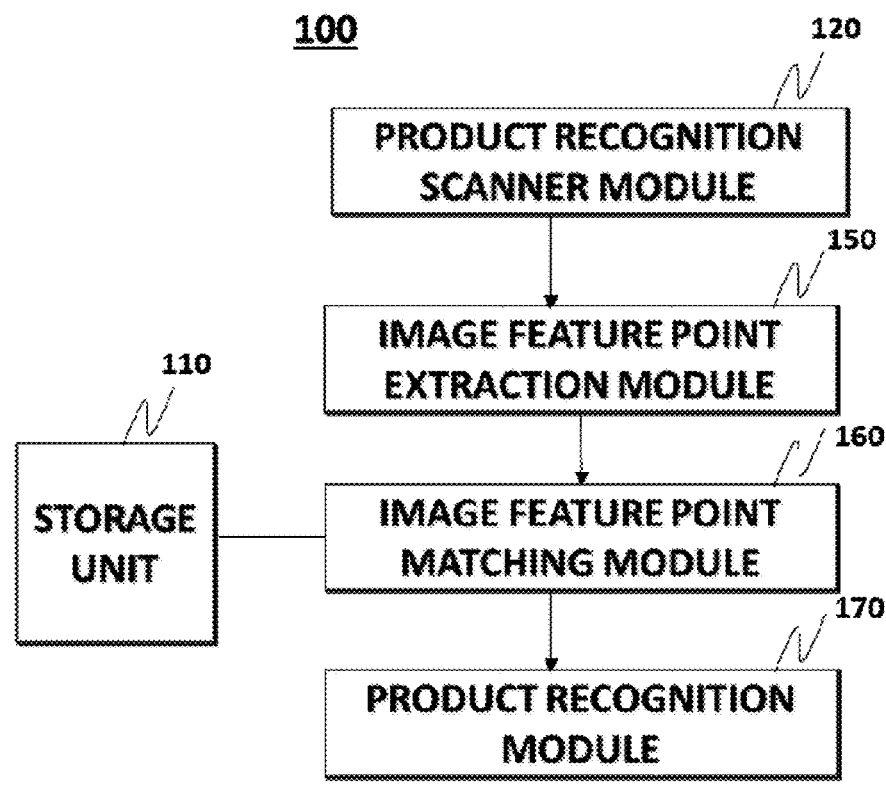
FIG. 3 is a schematic block diagram illustrating a configuration of the self-checkout device according to one embodiment of the present specification.

FIG. 3 is a schematic block diagram illustrating a configuration of the self-checkout device according to one embodiment of the present specification.

Referring to FIGS. 2 and 3, a self-checkout device 100 according to the present specification may include a storage unit 110, a product recognition scanner module 120, an image feature point extraction module 150, an image feature point matching module 160, and a product recognition module 170.

It may be helpful to an understanding of the present invention to regard the self-checkout device 100 according to the present specification as a device, that is, a "self-checkout counter" installed in large stores or medium-to-large size supermarkets to allow a customer to pay for purchased products. In the present specification, the term "self-checkout device" is used but is not necessarily used only for the purpose of allowing a customer to make a payment, and the purpose is not limited by the term.

The storage unit 110 may store barcode information about a plurality of products and feature point information about reference images for a plurality of product wrappers.

The term "reference image" refers to an image acquired by photographing a product wrapper and refers to an image captured when a product is photographed with a camera.

The term "feature point information about the reference image" refers to feature point data extracted from the reference image using the same or similar technology used in the image feature point extraction module 150 according to the present specification. The feature point information is information used to identify a product. A process of identifying a product in a captured image will be described in more detail below.

The storage unit 110 is a high-capacity storage medium such as a known semiconductor device or hard disk in or from which data can be stored or deleted, for example, a random access memory (RAM), a read-only memory (ROM), or an electrical erasable programmable read-only memory (EEPROM) and encompasses any device capable of storing information regardless of a device type and is not limited to a specific memory device.

The product recognition scanner module 120 may output a plurality of images of products, which are placed on a product rack, through a plurality of cameras.

The term "product rack" is a rack defining a space on which products to be purchased by a user are placed for payment, and the products placed on the product rack become targets photographed by the product recognition scanner module 120. According to one embodiment of the present specification, the product rack may be a conveyor belt. In this case, the products placed on the product rack by the user may be sequentially photographed while sequentially passing at the product recognition scanner module 120.

The product recognition scanner module 120 according to the present specification may include a plurality of cameras. A product may be photographed in various directions through the plurality of cameras. Therefore, regardless of a state in which a product to be paid for is placed on the product rack, it is possible to photograph a product wrapper.

According to one embodiment of the present specification, as shown in FIG. 2, the product recognition scanner module 120 may include a support frame having a "⊏" shape which surrounds a top side, a left side, and a right side of a product placed on the product rack. In addition, the plurality of cameras may be positioned on inner sides of the support frame and may be installed to photograph a product placed on the product rack.

Figure 4:
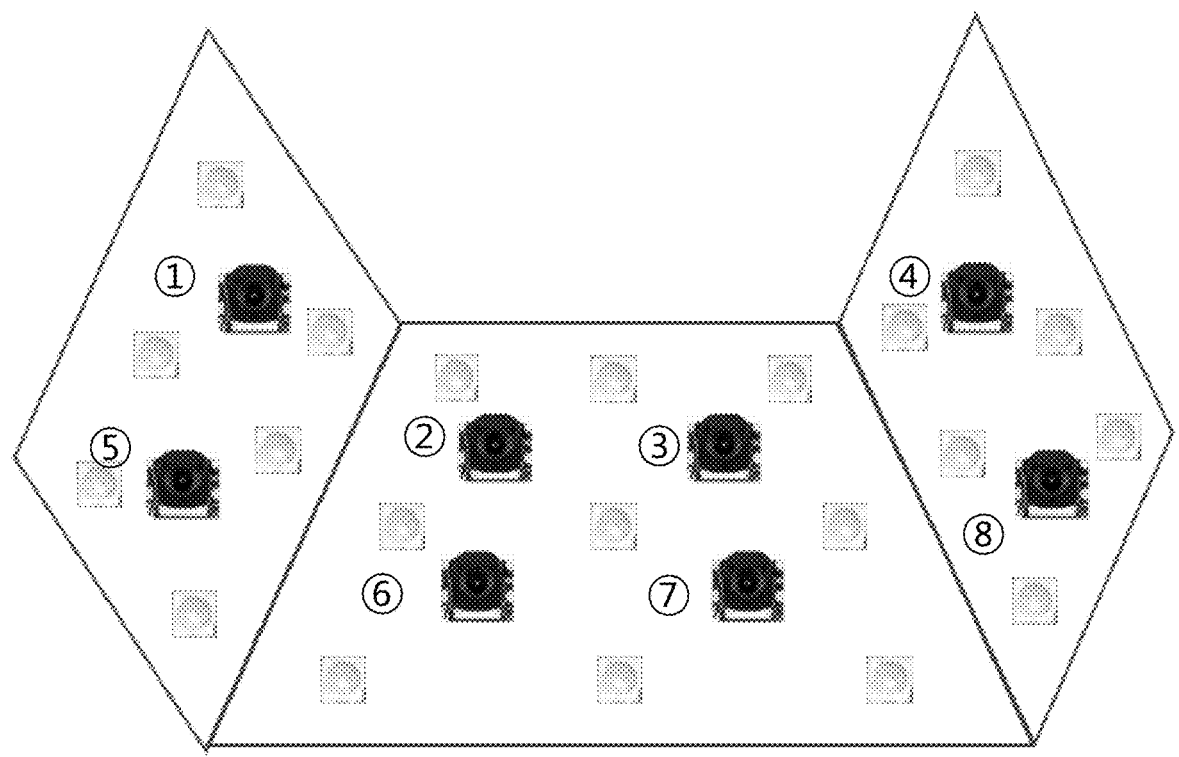
FIG. 4 is an exemplary diagram of inner sides of a product recognition scanner module according to one embodiment of the present specification.

FIG. 4 is an exemplary diagram of inner sides of the product recognition scanner module according to one embodiment of the present specification.

Referring to FIG. 4, it can be confirmed that eight cameras and lighting devices are installed on inner sides of the support frame having a "⊏" shape. For convenience, eight cameras will be referred as first to eighth cameras from the left. Among the eight cameras, the first and fifth cameras are installed to photograph a left side of a product, the fourth and eighth cameras are installed to photograph a right side of the product, and the second, third, sixth, and seventh cameras are installed to photograph a top side of the product.

Photographing directions of the cameras classified according to such photographed regions may cross each other. For example, the first camera may be installed such that the photographing direction thereof faces the fifth camera, and the fifth camera may be installed such that the photographing direction thereof faces the first camera. Similarly, the fourth camera may be installed such that the photographing direction thereof faces the eighth camera, and the eighth camera may be installed such that the photographing direction thereof faces the fourth camera. Meanwhile, in the case of the second, third, sixth, and seventh cameras which photograph the top side of the product, the second camera may be installed such that the photographing direction thereof faces the seventh camera, the third camera may be installed such that the photographing direction thereof faces the sixth camera, the sixth camera may be installed such that the photographing direction thereof faces the third camera, and the seventh camera may be installed such that the photographing direction thereof faces the second camera. Since the cameras are disposed such that angles of view of the cameras cross each other, it is possible to photograph various sides of a product at the same time. Such a cross arrangement may assist in increasing a recognition rate of a product later.

The self-checkout device 100 according to the present specification may further include a motion sensor (not shown) which senses whether a product placed on the product rack approaches. In this case, when the product is sensed by the motion sensor, the product recognition scanner module 120 may output a plurality of images through the plurality of cameras.

Meanwhile, FIG. 4 illustrates eight cameras merely as an example, and the number of the cameras of the product recognition scanner module 120 according to the present specification is not limited to the example.

The plurality of images captured by the product recognition scanner module 120 are transmitted to the image feature point extraction module 150. The image feature point extraction module 150 and the image feature point matching module 160 are configured to recognize a product by analyzing feature points of a product wrapper in an image itself acquired by photographing the product.

Product recognition through the image feature point extraction module 150 and the image feature point matching module 160 will be described.

Figure 5:
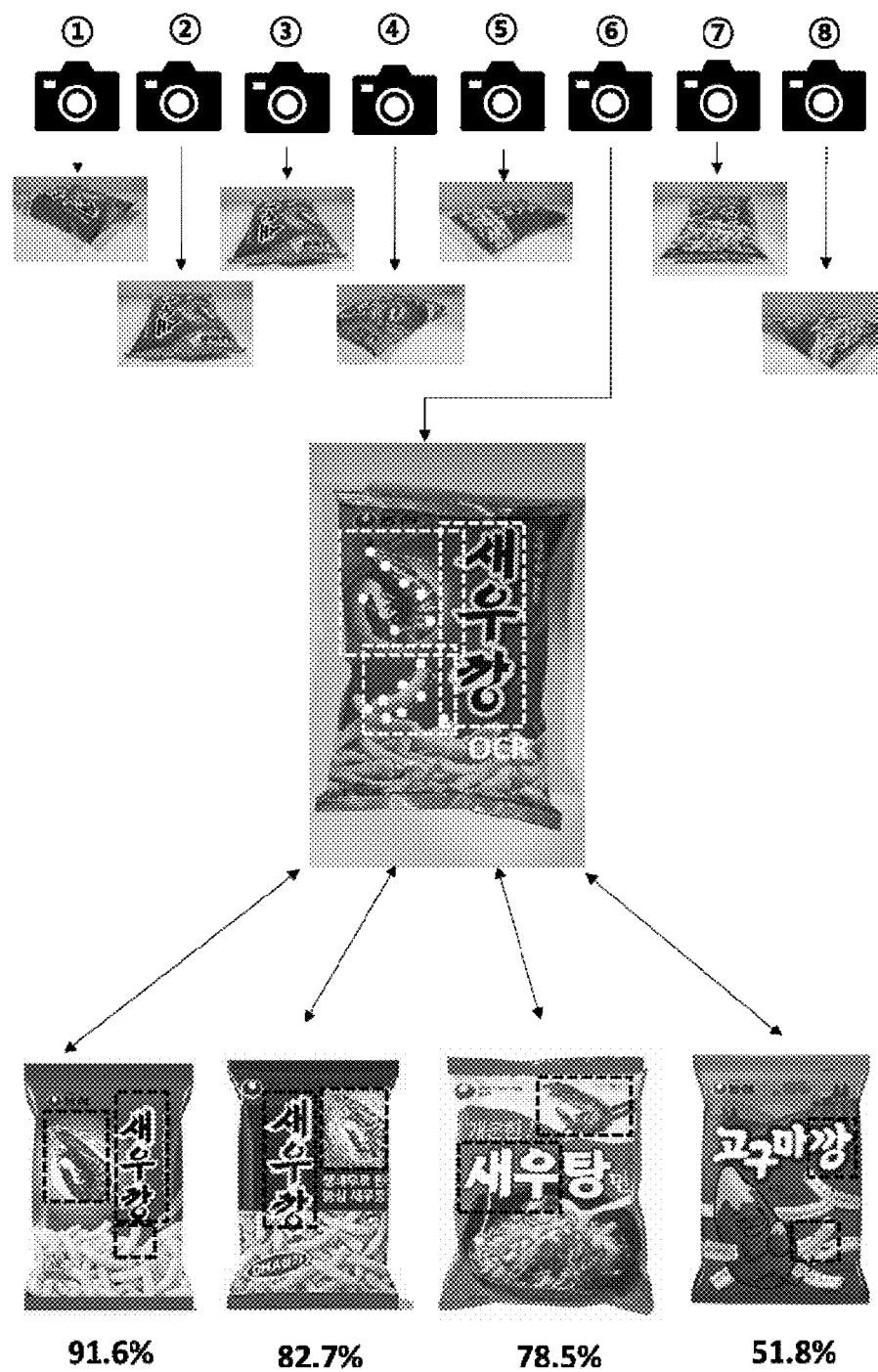
FIG. 5 is an exemplary diagram illustrating that a wrapper of a product is recognized through an image feature point extraction module and an image feature point matching module.

FIG. 5 is an exemplary diagram illustrating that a wrapper of a product is recognized through the image feature point extraction module and the image feature point matching module.

Referring to FIG. 5, images of a product photographed through eight cameras can be confirmed. The image feature point extraction module 150 may extract feature points from each of a plurality of images output from the product recognition scanner module 120. The image feature point extraction module 150 may convert an input image itself into images having various degrees of resolution (scale-space) and then may extract feature points from all of the images having each degree of resolution. If necessary, the image feature point extraction module 150 may extract characters printed on a wrapper through optical character recognition (OCR). A method of extracting feature points from an image and OCR are well known to those skilled in the art, and thus, detailed descriptions thereof will be omitted.

FIG. 5 shows that the image feature point extraction module 150 extracts feature points from an image captured through the sixth camera. This is merely an example for convenience of understanding, and an image feature point extracting operation may be performed on each of the plurality of images.

The image feature point matching module 160 may calculate matching ratios between the feature points of the images extracted by the image feature point extraction module 150 and feature points of reference images stored in the storage unit 110. The image feature point matching module 160 may calculate the matching ratio through probabilistic search technology. That is, the image feature point matching module 160 confirms how high a matching score appears between the image from which the feature points are extracted and the reference image stored in the storage unit 110, thereby outputting recognition results in the order of a high matching score. Thereafter, the calculated matching ratio may be output to the product recognition module 170.

The product recognition module 170 may recognize a product positioned at the product recognition scanner module 120 as a specific product by using matching ratio information calculated by the image feature point matching module 160. The recognized product may be delivered to a calculation processing module (not shown) for calculation. The calculation processing module (not shown) means a component which performs various operations related to a payment for a product, such as an operation of displaying a name and price of a product on a display, an operation of summing up an accumulated product price to calculate a total price, and an operation of reflecting discount information related to a product.

According to one embodiment of the present specification, the product recognition module 170 may perform recognition the product positioned at the product recognition scanner module as a specific product corresponding to a reference image having the highest matching ratio among the matching ratio information calculated by the image feature point matching module 160.

Meanwhile, when a user places a plurality of products on the product rack at the same time, two or more products may be photographed together. Accordingly, there is a need for a method of determining the presence or absence of a plurality of products and a method of recognizing a product accordingly. A plurality of products included in a captured image may be different products or identical products.

According to one embodiment of the present specification, the image feature point matching module 160 may output matching ratio information about a product having a preset reference ratio or higher among calculated matching ratios to the product recognition module 170.

Figure 6:
FIG. 6 is an exemplary diagram illustrating that a plurality of different products are photographed.

FIG. 6 is an exemplary diagram illustrating that a plurality of different products are photographed.

According to one embodiment of the present specification, the image feature point matching module 160 may determine that a plurality of products are present when different products are present within a preset error ratio based on the highest ratio value of calculated matching ratios. When it is determined that the plurality of products are present, the image feature point matching module 160 may output information about each of the plurality of products by inversely matching the feature points of the reference images stored in the storage unit 110 with feature points of images used by the image feature point extraction module 150 (which are a plurality of images output from the product recognition scanner module and used to extract a feature point of an image). The term "inverse matching" refers to a process of substituting the reference image stored in the storage unit 110 into the image output from the product recognition scanner module 120 and determining whether the reference image is identical to the output image.

Figure 7:
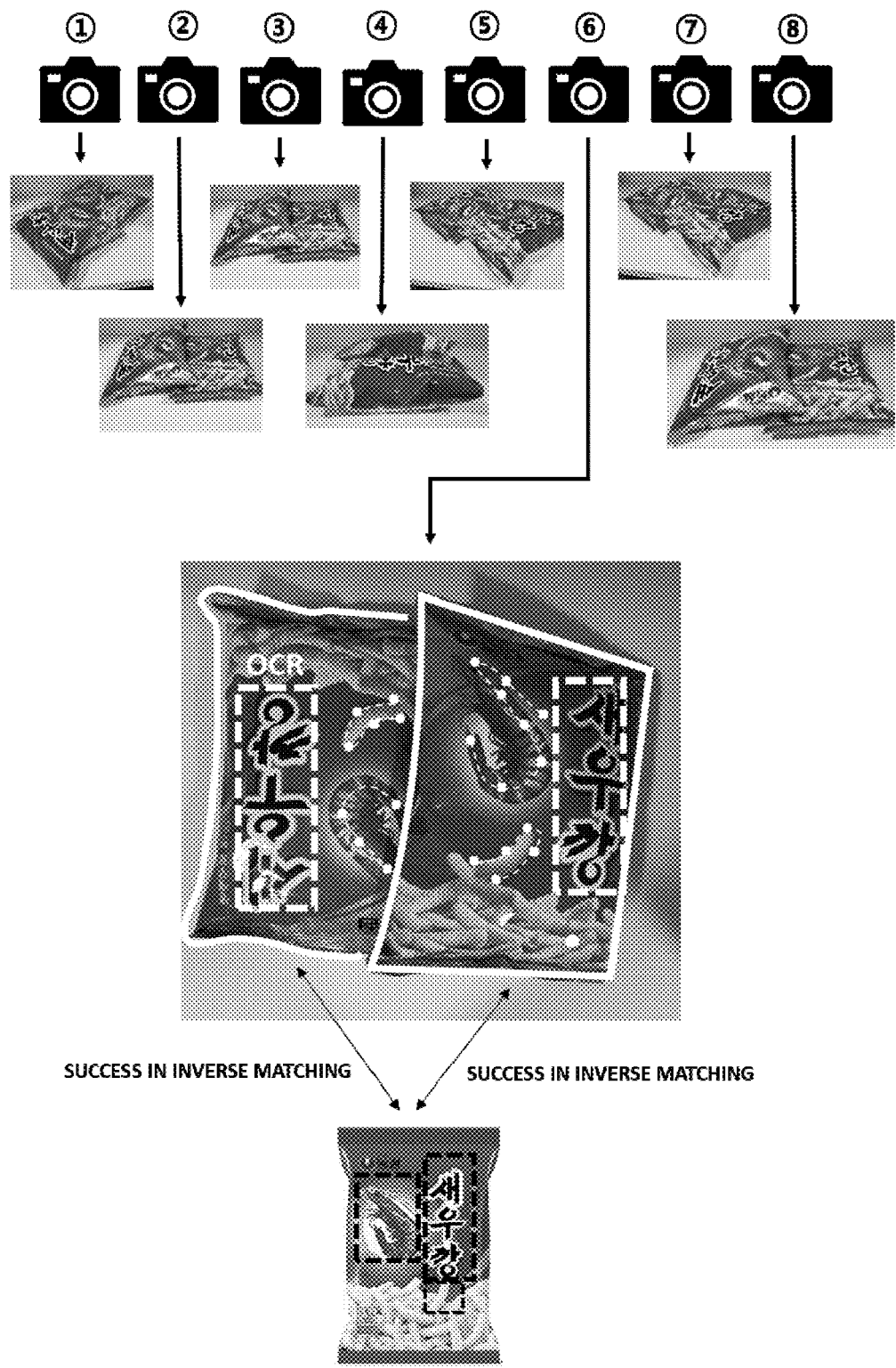
FIG. 7 is an exemplary diagram illustrating that a plurality of identical products are photographed.

FIG. 7 is an exemplary diagram illustrating that a plurality of identical products are photographed.

Referring to FIG. 7, it can be confirmed that two identical products are photographed in an image output from the product recognition scanner module 120. In FIG. 7, for convenience of understanding, an example of an image captured through a sixth camera will also be described. However, it should be considered that the image feature point extraction module 150 and the image feature point matching module 160 may perform the same operation on a plurality of images.

According to one embodiment of the present specification, the image feature point matching module 160 may recognize a plurality of identical products by inversely matching feature points of a reference image of a product having the highest calculated matching ratio with feature points of each image input to the image feature point extraction module 150.

More specifically, in order to accurately obtain the number of products, feature points, which succeed in inverse matching among the feature points of each image input to the image feature point extraction module 150, are grouped. An inherent size and pose of a feature point group belonging to one image may be obtained, and an inherent size and pose of a feature point group belonging to another image may also be determined. By comparing the two values, it is possible to determine whether one identical product has been photographed or a plurality of identical products have been photographed in different camera images. Inverse matching and grouping through the feature points of the image may be implemented through a RANSAC algorithm.

Meanwhile, among the feature points of the reference image stored in the storage unit 110, there may be a feature point that is relatively useful for product recognition, and there may be a feature point that is not relatively useful. For example, a clear image of a product name or a product wrapper may become a feature point that is frequently used for recognition. On the other hand, a portion which may also be commonly used for other products, such as a price or weight of a product, may be a feature point that is not frequently used. Therefore, product recognition can be operated more effectively through a use frequency or matching frequency of the feature points.

Figure 8:
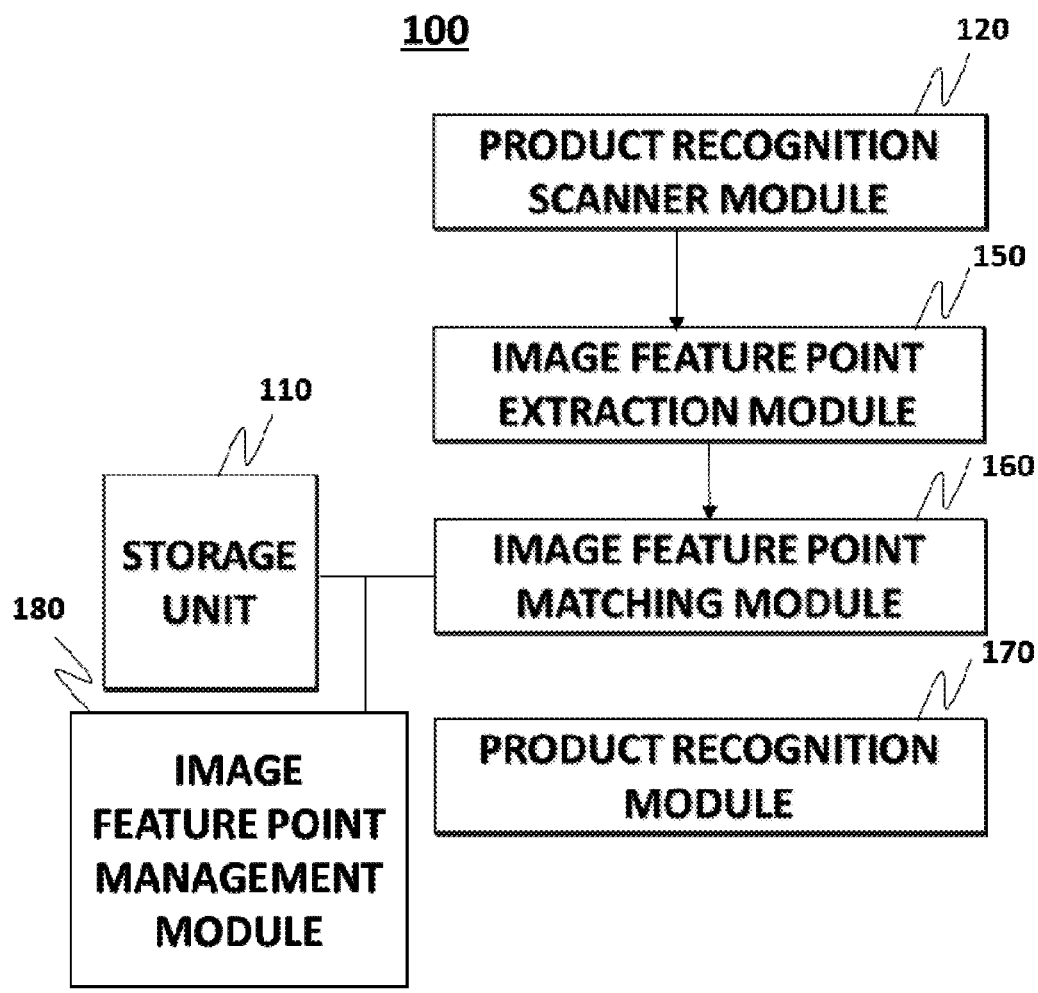
FIG. 8 is a block diagram illustrating a configuration of a self-checkout device according to another embodiment of the present specification.

FIG. 8 is a block diagram illustrating a configuration of a self-checkout device according to another embodiment of the present specification.

Referring to FIG. 8, a self-checkout device 100 according to the present specification may further include an image feature point management module 180.

The image feature point management module 180 may store a matching frequency for each feature point of feature points of reference images for specific products stored in the storage unit 110, which matches a feature point of an image extracted by the image feature point extraction module 150. The image feature point management module 180 may classify the feature points of the reference images for the specific products, which are stored in the storage unit 110, into groups according to at least one matching frequency criterion set in advance.

For example, it is assumed that a reference image for any one product has 100 feature points. The 100 feature points may not match feature points of an image extracted by the image feature point extraction module each time. That is, only some of the 100 feature points may match the extracted feature points, and specific feature points may be frequently used. In this case, the image feature point management module 180 may store information about a matching frequency for each feature point, that is, information about the number of instances of matching. The image feature point management module 180 may classify the 100 feature points into groups based on, for example, a matching frequency criterion of 50%. For example, feature points having a relatively high matching frequency may be stored in a "long-term group," and feature points having a relatively low matching frequency may be stored in a "short-term group."

After a preset storage period has elapsed, the image feature point management module 180 may delete feature points, which are included in a group having the lowest matching frequency among the feature points classified into the groups, from the storage unit 110. As a result, a storage space of the storage unit 110 can be used more efficiently.

Meanwhile, the image feature point matching module 160 may first calculate matching ratios between feature points, which are included in the group having the highest matching frequency among the classified feature points, and the feature points of the image extracted by the image feature point extraction module 150. Therefore, the image feature point matching module 160 may more rapidly calculate a feature point matching ratio.

Meanwhile, feature point-based recognition technology has general characteristics in which, even when a size of an exposed product wrapper is different, a product is well recognized (regardless of a short distance or long distance to the product), but a result showing the highest similarity is not ensured to be 100% accurate. Therefore, a reference image having the highest matching ratio may not necessarily match a product positioned at the product recognition scanner module 120. In order to compensate for this, a barcode marked on a product may be used.

Figure 9:
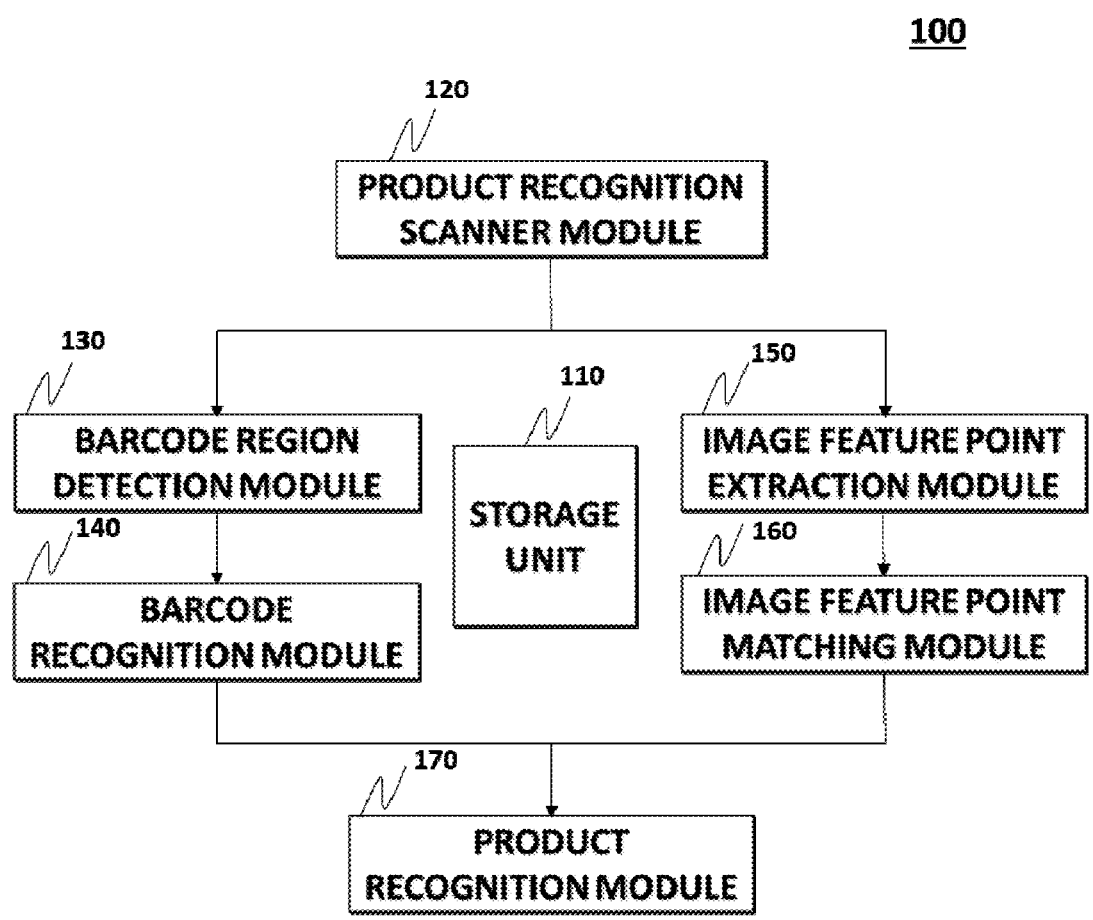
FIG. 9 is a schematic block diagram illustrating a configuration of a self-checkout device according to still another embodiment of the present specification.

FIG. 9 is a schematic block diagram illustrating a configuration of a self-checkout device according to still another embodiment of the present specification.

Referring to FIG. 9, a self-checkout device 100 according to still another embodiment of the present specification may further include a barcode region detection module 130 and a barcode recognition module 140.

In this case, the storage unit 110 may further store barcode information about a product. A barcode expresses letters, numbers, and symbols by combining bars (black bars) and spaces (white bars) in a specific form, and the number written below the barcode may be read by a scanner. The term "barcode information" means information about a country number, a company number, a serial number, and a price of a manufactured product, as well as corresponding numeric information when the barcode is read. For convenience of understanding, in the present specification, a product name and a product price required for product payment will be set to correspond to the barcode information.

A plurality of images captured by the product recognition scanner module 120 may be transmitted to the barcode region detection module 130 and the image feature point extraction module 150.

The barcode region detection module 130 may select an image in which a product barcode is photographed among the plurality of images output from the product recognition scanner module 120 and may extract a product barcode region from the selected image. As described above, a product may be photographed in various directions through the plurality of cameras. Therefore, a barcode of a product may be photographed regardless of a state in which a product to be paid is placed on a product rack.

The barcode recognition module 140 may recognize a product barcode image extracted by the barcode region detection module 130 as barcode information.

In this case, the product recognition module 170 may recognize a product positioned at the product recognition scanner module 120 as a specific product having information which matches barcode information among barcodes stored in the storage unit 110, which is recognized by the barcode recognition module 140.

Figure 10:
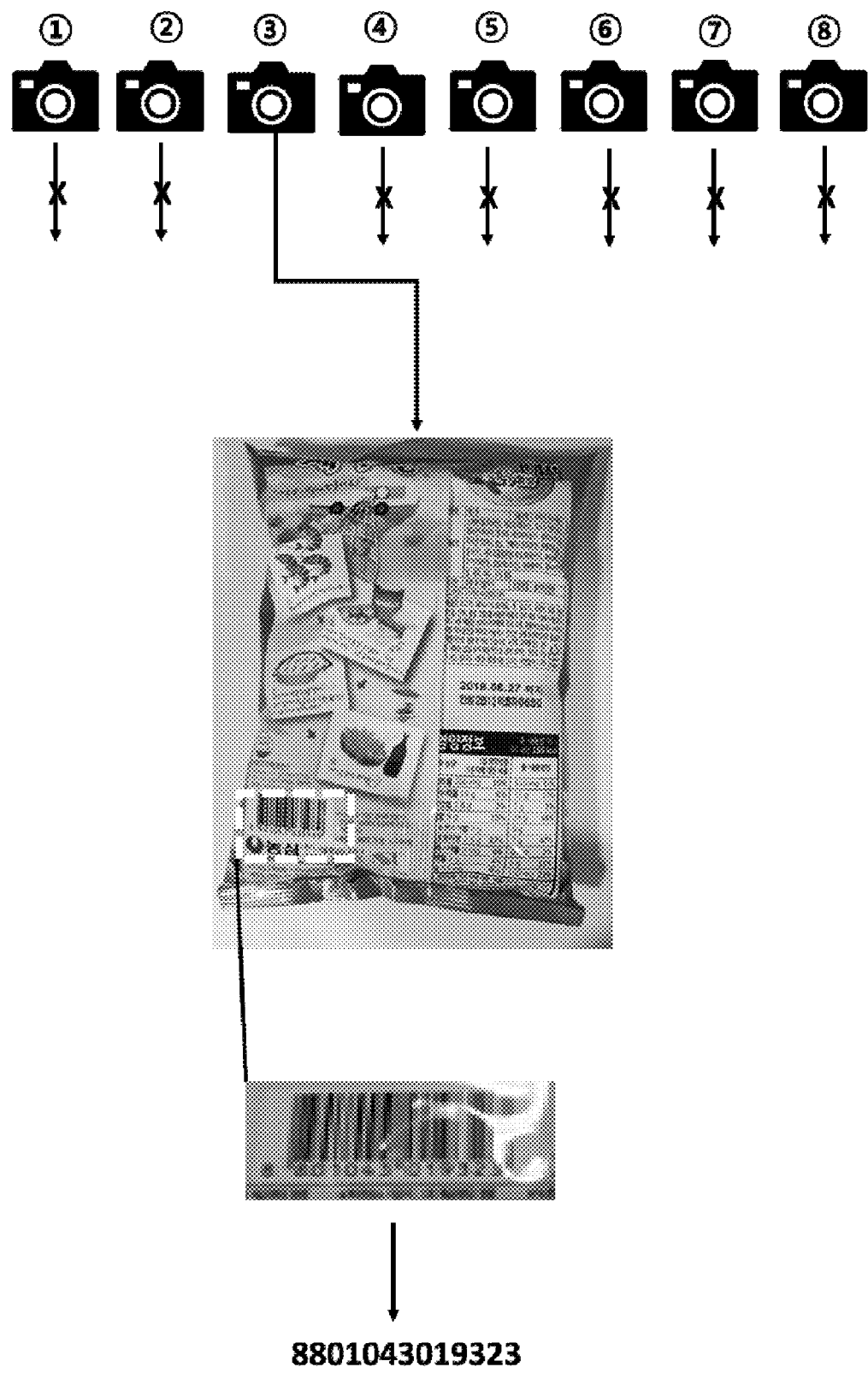
FIG. 10 is an exemplary diagram illustrating that barcode information is extracted through a barcode region detection module and a barcode recognition module.

FIG. 10 is an exemplary diagram illustrating that barcode information is extracted through the barcode region detection module and the barcode recognition module.

The barcode region detection module 130 may select an image in which a product barcode is photographed among a plurality of images output from the product recognition scanner module 120 and may extract a product barcode region from the selected image. In general, since bars of a barcode are marked in black on a white background, a barcode region may be extracted in an image through such a pattern.

The barcode recognition module 140 may recognize a product barcode image extracted by the barcode region detection module 130 as barcode information. More specifically, the barcode recognition module 140 may scan a barcode along a scan line, may distinguish black and white pixels into 1 and −1, and may interpret sequence and position information thereof in a codebook. Then, the barcode recognition module 140 may perform a process of confirming a checksum for verification twice, i.e., may perform the process from left to right once and perform the process from right to right once to confirm even an orientation of a barcode, thereby performing recognition. Thereafter, the barcode information may be output to the product recognition module 170. The product recognition module 170 may recognize a product matching a product recognized by the barcode recognition module 140 as a product positioned at the product recognition scanner module 120.

The self-checkout device 100 according to still another embodiment of the present specification may identify a product by extracting barcode information from an image acquired by photographing the product or by analyzing a product wrapper. More specifically, the product recognition module 170 may recognize a product positioned at the product recognition scanner module 120 as i) a specific product having information which matches barcode information among barcodes stored in the storage unit 110, which is recognized by the barcode recognition module 140, or as ii) a specific product using a matching ratio information calculated by the image feature point matching module 160. That is, two methods may be used simultaneously to recognize a product. In this case, since various cases may occur according to a state of two pieces of information, it is necessary to consider which product is recognized according to barcode information and a wrapper image analysis.

According to one embodiment of the present specification, the product recognition module 170 may recognize a product positioned at the product recognition scanner module 120 using first output information of i) barcode information recognized by the barcode recognition module 140 and ii) matching ratio information calculated by the image feature point matching module 160. Accordingly, when a product is recognized through one of the two methods, it is possible to rapidly pay for the product using the information.

According to another embodiment of the present specification, when i) a product recognized through barcode information recognized by the barcode recognition module 140 matches ii) a product recognized through matching ratio information calculated by the image feature point matching module 160, the product recognition module 170 may recognize the product as a product positioned at the product recognition scanner module 120. The present embodiment is an example for minimizing an error of an algorithm, and a product can be prevented from being misrecognized as another product.

According to still another embodiment of the present specification, when i) a product recognized through barcode information recognized by the barcode recognition module 140 is different from ii) a product recognized through matching ratio information calculated by the image feature point matching module 160, the product recognition module 170 may recognize i) the product recognized through the barcode information recognized by the barcode recognition module 140 as a product positioned at the product recognition scanner module 120. That is, due to technology characteristics, barcode recognition uses characteristics in which, when recognition is possible, a false recognition rate is close to 0%.

Meanwhile, although the barcode region detection module 130, the barcode recognition module 140, the image feature point extraction module 150, the image feature point matching module 160, the product recognition module 170, and the image feature point management module 180 have been described as components that are distinguished according to roles or functions thereof, the components have a common point in terms of a process of processing image data output from the product recognition scanner module 120. Accordingly, the barcode region detection module 130, the barcode recognition module 140, the image feature point extraction module 150, the image feature point matching module 160, the product recognition module 170, and the image feature point management module 180 may be components that are physically separated, but in order to perform the above-described roles or functions, the modules may include a processor, an application-specific integrated circuit (ASIC), other chipsets, a logic circuit, a register, a communication modem, a data processing device, and the like, known in the technical field to which the present invention pertains.

Furthermore, roles or functions of the barcode region detection module 130, the barcode recognition module 140, the image feature point extraction module 150, the image feature point matching module 160, the product recognition module 170, and the image feature point management module 180 may be implemented as computer programs. The computer program may be stored in the storage unit 110 and executed by a processor.

The computer program described above may include a code encoded in a computer language such as C, C++, JAVA, a machine language, or the like that may be read by a processor (CPU) of the computer through a device interface of the computer in order to cause the computer to read the program and execute the methods implemented in the program. This code may include functional codes related to functions or the like that define the necessary functions for executing the methods and include control codes related to the execution procedures necessary to cause the processor of the computer to execute the functions in a predetermined procedure. In addition, the code may further include a memory reference related code for additional information or media necessary to cause the processor of the computer to perform the functions as to which location (address) of the computer's internal or external memory should be referenced. Furthermore, when the processor of the computer needs to communicate with any other computers or servers remotely to perform the functions, the code may further include a communication related code as to whether how to communicate with any other computers or servers remotely using the communication module of the computer or which information or media should be transmitted or received during communication.

The stored medium is not a medium for storing data for a short time, such as a register, a cache, or a memory and refers to a medium which semi-permanently stores data and is capable of being read by a device. Examples of the stored medium include ROMs, RAMs, CD-ROMs, magnetic tapes, floppy disks, and optical data storage devices, but the present invention is not limited thereto. That is, the program may be stored in various recording media used for various servers accessible by the computer, or on various recording media used for the user's computer. In addition, the medium may be distributed over a network-connected computer system, and a computer-readable code may be stored in a distributed manner.

Although the embodiments of the present invention has been described with reference to the accompanying drawings, it should be understood that those skilled in the art can carry out other modifications without changing the technical spirit or essential features of the present invention. Therefore, it should be understood that the embodiments described herein are illustrative and not restrictive in all aspects.

The invention claimed is:

1. A self-checkout device comprising:
   a storage unit configured to store feature point information about reference images for a plurality of product wrappers;

a product recognition scanner module configured to output a plurality of images of a product placed on a product rack through a plurality of cameras;

an image feature point extraction module configured to extract feature points of each image of the plurality of images output from the product recognition scanner module;

an image feature point matching module configured to calculate matching ratios between the feature points of the images extracted by the image feature point extraction module and feature points of the reference images stored in the storage unit;

a product recognition module configured to recognize the product positioned at the product recognition scanner module as a specific product using matching ratio information calculated by the image feature point matching module; and an image feature point management module configured to store a matching frequency for each feature point, which matches the feature point of the image extracted by the image feature point extraction module, of the feature points of the reference images stored in the storage unit and configured to classify the feature points of the reference images stored in the storage unit into groups according to at least one matching frequency criterion set in advance.

2. The self-checkout device of claim 1, wherein the product rack is a conveyer belt.

3. The self-checkout device of claim 1, wherein the product recognition scanner module includes:
   a support frame having a form which surrounds a top side, a left side, and a right side of the product placed on the product rack; and
   the plurality of cameras positioned on an inner side of the support frame and installed to photograph the product placed on the product rack.

4. The self-checkout device of claim 1, further comprising a motion sensor configured to sense whether the product placed on the product rack approaches,
   wherein, when the product is sensed by the motion sensor, the product recognition scanner module outputs the plurality of images through the plurality of cameras.

5. The self-checkout device of claim 1, wherein the product recognition module performs recognition the product positioned at the product recognition scanner module as a specific product corresponding to a reference image having a highest matching ratio among the matching ratio information calculated by the image feature point matching module.

6. The self-checkout device of claim 1, wherein the image feature point matching module outputs matching ratio information about a product, which has a preset reference ratio or higher among the calculated matching ratios, to the product recognition module.

7. The self-checkout device of claim 1, wherein the image feature point matching module determines that a plurality of products are present when different products are present within a preset error ratio based on a highest ratio value of the calculated matching ratios.

8. The self-checkout device of claim 7, wherein the image feature point matching module outputs information about each of the plurality of products by inversely matching the feature points of the reference images stored in the storage unit with the feature points of the images used by the image feature point extraction module (the plurality of images output from the product recognition scanner module and used to extract a feature point of an image).

9. The self-checkout device of claim 1, wherein, after a preset storage period has elapsed, the image feature point management module deletes the feature points, which are included in a group having a relatively lowest matching frequency among the feature points classified into the groups, from the storage unit.

10. The self-checkout device of claim 1, wherein the image feature point matching module first calculates the matching ratios between the feature points, which are included in a group having a highest matching frequency among the classified feature points, and the feature points of the image extracted by the image feature point extraction module.

11. The self-checkout device of claim 1, wherein the storage unit further stores barcode information about the product,
   the self-checkout device further includes a barcode region detection module configured to select the image in which a product barcode is photographed among the plurality of images output from the product recognition scanner module and extract a product barcode region from the selected image, and a barcode recognition module configured to recognize a product barcode image extracted by the barcode region detection module as the barcode information, and
   the product recognition module recognizes the product positioned at the product recognition scanner module as a specific product having information which matches the barcode information, which is recognized by the barcode recognition module, among barcodes stored in the storage unit.

12. The self-checkout device of claim 11, wherein the product recognition module recognizes the product positioned at the product recognition scanner module using first output information of i) the barcode information recognized by the barcode recognition module and ii) the matching ratio information calculated by the image feature point matching module.

13. The self-checkout device of claim 11, wherein, when i) the product recognized through the barcode information recognized by the barcode recognition module matches ii) a product recognized through matching ratio information calculated by the image feature point matching module, the product recognition module recognizes the matched product as the product positioned at the product recognition scanner module.

14. The self-checkout device of claim 11, wherein, when i) the product recognized through the barcode information recognized by the barcode recognition module is different from ii) a product recognized through matching ratio information calculated by the image feature point matching module, the product recognition module recognizes the product recognized through the barcode information recognized by the barcode recognition module as the product positioned at the product recognition scanner module.

* * * * *